(12) United States Patent
Rensberger

(10) Patent No.: US 7,133,025 B2
(45) Date of Patent: *Nov. 7, 2006

(54) POINTING DEVICE REPORTING UTILIZING SCALING

(75) Inventor: Gary Rensberger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/122,588

(22) Filed: May 5, 2005

(65) Prior Publication Data

US 2005/0190151 A1    Sep. 1, 2005

Related U.S. Application Data

(60) Continuation of application No. 10/874,560, filed on Jun. 22, 2004, now Pat. No. 6,975,300, which is a division of application No. 10/068,980, filed on Feb. 11, 2002, now Pat. No. 6,774,915.

(51) Int. Cl.
  *G09G 5/08* (2006.01)
  *G09G 5/00* (2006.01)

(52) U.S. Cl. ........................... 345/157; 345/660

(58) Field of Classification Search ................ 345/660, 345/157, 661, 665, 156

See application file for complete search history.

(56) References Cited

U.S. PATENT DOCUMENTS 6,052,115 A    4/2000   Gregg et al.

FOREIGN PATENT DOCUMENTS

JP    05100792    4/1993

*Primary Examiner*—Kee M. Tung
*Assistant Examiner*—Aaron M. Richer
(74) *Attorney, Agent, or Firm*—Banner & Witcoff, Ltd.

(57) ABSTRACT

Computer-readable media executable by a computer are provided for reporting a movement amount of an operation instrumentality of the pointing device. A first value representing the movement amount in a first direction is examined. Whether scaling should be performed is determined based on the first value. When it is determined that scaling is to be performed, the first value is scaled by a first scaling factor and a first scaling indicator is set to indicate that the first value is scaled by the first scaling factor. Reporting information is then output, including the first value if scaling has not been performed, and when scaling has been performed, the reporting information includes the scaled first value and the first scaling indicator. The first value may be scaled by one of a plurality of scaling factors selected based on the first value.

8 Claims, 6 Drawing Sheets

```
                Bit definitions in packet
RFPacket[X]   = [xS] [x6] [x5] [x4] x[3] [x2] [x1] [x0]
RFPacket[Y]   = [yS] [y6] [y5] [y4] [y3] [y2] [y1] [y0]
Flags         = [ScaleFlag[X]] [ScaleFlag[Y]]
```

POINTING DEVICE REPORTING UTILIZING SCALING

This is a continuation of U.S. patent application Ser. No. 10/874,560 entitled "POINTING DEVICE REPORTING UTILIZING SCALING" filed Jun. 22, 2004 now U.S. Pat. No. 6,975,300, which is a divisional patent application Ser No. 10/068,980, filed Feb. 11, 2002 of U.S. Pat. No. 6,774,915 entitled "POINTING DEVICE REPORTING UTILIZING SCALING" issued Aug. 10, 2004 for which priority is claimed. The parent application is incorporated herein by reference in its entirety.

FIELD OF THE INVENTION

The present invention relates to computer-readable media used with computers and other data input devices. More specifically, the invention relates to a format for reporting the change in position of an operation instrumentality of a pointing device.

BACKGROUND OF THE INVENTION

Known mechanical computer mice have been specified to have a resolution of 400 dots per inch (dpi) and a maximum speed of 5 inches per second (ips), and may be tested before shipping to 7 ips. Some optical sensors within optical computer mice may be specified as having the same resolution as mechanical computer mice, but are capable of much higher speeds, such as speeds greater than 50 ips. In prior computer mice (both mechanical and optical), the resolution and speed limits imply that no more than 7 bits of magnitude are needed to transmit the number of dots ($\Delta x$, $\Delta y$) counted during sampling intervals. For example, values from 0 through 127 can be represented in a 7 bit value and values in the range of −128 through 127 can be represented by a two's-complement value in 8 bits (a 7 bit magnitude and a sign bit).

One particular prior art optical wireless computer mouse appears to send an 8 bit signed value (using a resolution of 800 dpi), indicating an amount of movement in each of a horizontal and vertical direction, via a Radio Frequency (RF) packet every 20 milliseconds. This would yield a maximum mouse speed of about 8 ips. (50 RF packets per second (20 millisecond time intervals)×127 (maximum signed 8 bit value)×0.00125 inches per dot (800 dpi resolution)=7.9375 inches per second). Using a resolution of 400 dpi would yield a maximum speed of about 16 ips; however, the maximum tracking speed that a low speed USB device can support is 36 ips (at a 400 dpi resolution).

A ten-fold increase in speed, as may be attained by an optical mouse, means that the $\Delta x$, $\Delta y$ data could have a magnitude up to ten times larger than the magnitude for prior art mechanical mice. Therefore, 4 additional bits, or 11 bits would be required to report such a magnitude and 12 bits would be required to report the 11 bit magnitude and a sign bit. Since the smallest unit of addressable memory is a byte, an additional byte of memory would be required to accommodate the additional bits for reporting such a large magnitude. Given that available memory, such as Random Access Memory (RAM), is limited, a means for reporting such a large magnitude without using additional bits to represent the magnitude would be desirable.

BRIEF SUMMARY OF THE INVENTION

The present invention addresses the above situation by providing for computer-readable media for a pointing device to report a movement amount of an operation instrumentality of a pointing device, such that fewer bits may be used to report the movement amount of the operation instrumentality than when using a conventional reporting method.

In a first aspect of the invention, a method is provided for reporting a movement amount of an operation instrumentality of a pointing device. A first value representing the movement amount in a first direction is examined. A determination is made as to whether scaling of the first value is to be performed based on the first value. When scaling is to be performed, the first value is scaled by the first scaling factor and a first scaling indicator is set to indicate that the first value is scaled by the first scaling factor. Reporting information is then output. If no scaling has been performed, the reporting information includes the first value. If scaling has been performed, the reporting information includes the scaled first value and the first scaling indicator.

In a second aspect of the invention, a pointing device is provided. The pointing device includes a tracking engine, determining means, a scaler, and a position reporter. The tracking engine is configured to track a movement amount of an operation instrumentality of the pointing device in a first direction, and to indicate the movement amount as a first value. The determining means is configured to examine the first value to determine whether scaling of the first value should be performed based on the first value. The scaler is configured to scale the first value by a first scaling factor when the determining means determines that scaling is to be performed. The position reporter is configured to report information including the first value if no scaling has been performed, and to report information including the scaled first value and the first scaling indicator, corresponding to the first scaling factor, if scaling has been performed.

In a third aspect of the invention, a method is provided for reporting a movement amount of an operation instrumentality of a pointing device. A first value representing the movement amount in a first direction is examined. The first value is checked to determine whether the first value can be represented by a first predetermined number of bits. When the first value cannot be represented by the first predetermined number of bits, the first value is scaled by a first scaling factor and a first scaling indicator is set to indicate that the first value is scaled. Reporting information is then output. If no scaling has been performed, the reporting information includes the first value. If scaling has been performed, the reporting information includes the scaled first value and the first scaling indicator.

In a fourth aspect of the invention, a method is provided for reporting a movement amount of an operation instrumentality of a pointing device. A first value representing the movement amount in a first direction is examined. The first value is checked to determine whether the first value can be represented by a first predetermined number of bits. When the first value can be represented by the first predetermined number of bits, a first scaling indicator is set to indicate that the first value is unscaled. When the first value cannot be represented by the first predetermined number of bits, the first value is checked to determine whether the first value can be represented by a second predetermined number of bits, which is different from the first predetermined number of bits. When the first value can be represented by the second predetermined number of bits, the first value is scaled by a first scaling factor and a first scaling indicator is set to indicate that the first value is scaled by the first scaling factor. When the first value cannot be represented by the second predetermined number of bits, the first value is checked to determine whether the first value can be represented by a third predetermined number of bits, which is different from the first and the second predetermined numbers of bits. When the first value can be represented by the third predetermined number of bits, the first value is scaled by a second scaling factor and the first scaling indicator is set to indicate that the first value is scaled by the second scaling factor. Reporting information is then output. If no scaling has been performed, the reporting information includes the first value. If scaling has been performed, the reporting information includes the scaled first value and the first scaling indicator.

In a fifth aspect of the invention, a pointing device is provided. The pointing device includes a tracking engine, determining means, a scaler, and a position reporter. The tracking engine is configured to track a movement amount of an operation instrumentality of the pointing device in a first direction, and to indicate the movement amount as a first value. The determining means is configured to determine whether the first value can be represented by a first predetermined number of bits. When the determining means determines that the first value can be represented by the first predetermined number of bits, a first scaling indicator is set to indicate that the first value is unscaled. When the first value cannot be represented by the first predetermined number of bits, the determining means determines whether the first value can be represented by a second predetermined number of bits, which is different from the first predetermined number of bits. When the first value can be represented by the second predetermined number of bits, the scaler is configured to scale the first value by a first scaling factor and to set a first scaling indicator to indicate that the first value is scaled by the first scaling factor. When the determining means determines that the first value cannot be represented by the second predetermined number of bits, the determining means determines whether the first value can be represented by a third predetermined number of bits, which is different from the first and the second predetermined numbers of bits. When the determining means determines that the first value can be represented by the third predetermined number of bits, the scaler is configured to scale the first value by a second scaling factor, and to set the first scaling indicator to indicate that the first value is scaled by the second scaling factor. The position reporter is configured to report information including the first value if no scaling has been performed, and to report information including the scaled first value and the first scaling indicator, if scaling has been performed.

In a sixth aspect of the invention, a pointing device having a tracking engine, determining means, a scaler and a position reporter is provided. The tracking engine is configured to track a movement amount of an operation instrumentality of the pointing device in a first direction, and to indicate the movement amount as a first value. The determining means is configured to determine the smallest of a first, second and third ranges of values into which the first value falls, and to set a first scaling indicator to indicate scaling by a first selected scaling factor based on the determined range if the first value falls into one of the first, the second and the third ranges. A scaler is configured to scale the first value by the first selected scaling factor. The position reporter is configured to report information including the first value if no scaling has been performed, and to report information including the scaled first value and the first scaling indicator, if scaling has been performed.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

The present invention has been described in terms of preferred and exemplary embodiments thereof. Numerous other embodiments, modifications and variations within the scope and spirit of the appended claims will occur to persons of ordinary skill in the art from a review of this disclosure.

Figure 1:
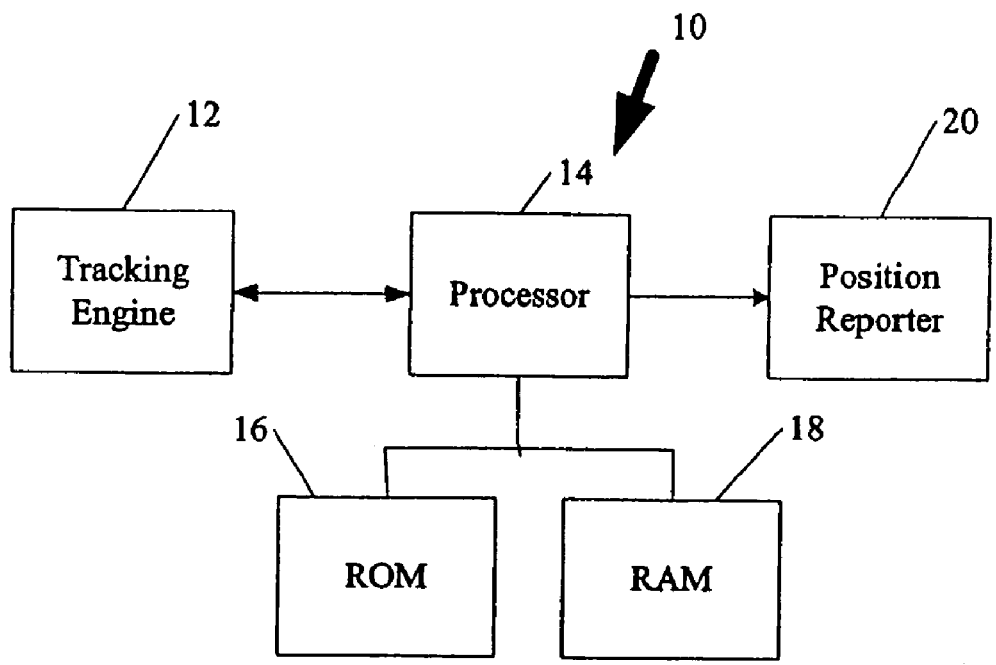
FIG. 1 is a block diagram of a pointing device representing an embodiment of the invention.

Referring to the block diagram of FIG. 1, a computer pointing device 10 includes a tracking engine, which tracks an amount of movement of an operation instrumentality of (or associated with) a pointing device. The operation instrumentality may be, e.g., a mouse body itself or a movable member thereof such as a ball, a track ball in a track ball device, a pen in a pen-based input device or a user's finger along a touch pad or the like. The tracked amount of movement of the operation instrumentality of the pointing device is used to determine a position of a pointer appearing on a display. A processor 14 may periodically poll tracking engine 12 to receive values representing a change in position of the operation instrumentality. The values may represent a change in position of a number of dots, wherein a typical resolution is 400 dots per inch (dpi). In this embodiment of the invention, two values are reported, XCount, representing a change in position in a horizontal direction and YCount, representing a change in position in a vertical direction. Processor 14 may be connected via a bus to computer memory, such as Read Only Memory 16 (ROM) and Random Access Memory 18 (RAM). Processor 14 provides the values representing the change in the horizontal and the vertical positions to position reporter 20 for reporting.

Figure 2:
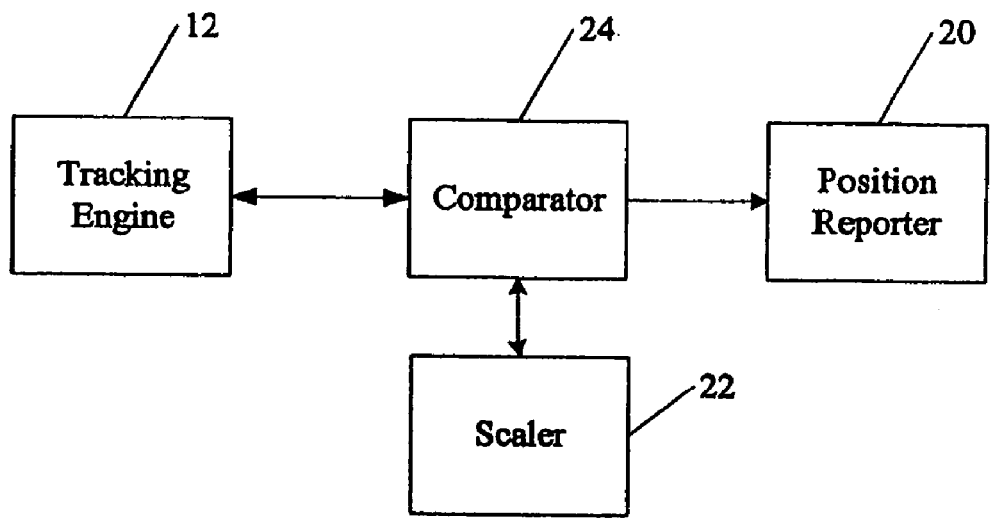
FIG. 2 is a functional block diagram of the pointing device illustrated in FIG. 1.

Referring to the functional block diagram of FIG. 2, tracking engine 12 may receive polls from comparator 24 and supplies comparator 24 with values representing a change in position of the operation instrumentality of the pointing device. In this embodiment, the values represent a change in a horizontal and a vertical direction. Comparator 24 examines the values representing an amount of movement in each of the two directions and determines whether each of the values can be represented in a predetermined number of bits. For example, if eight bits are used to represent a signed value in a two's complement representation, the eight bits may represent a value in the range from −128 to +127. If either of the two values, representing a change in movement in the two directions, respectively, can be represented in an eight bit signed representation, then the values will be provided to a position reporter 20 for reporting to, for example, a personal computer. If either of the two values cannot be represented by the predetermined number of bits, for example, eight bits, for a signed representation, then the respective value will be scaled (e.g., divided) by a scaling factor, such as, for example, four, and a scaling indicator will be set to indicate that the reported value has been scaled. The values and the scaling factors are then provided to position reporter 20 for reporting.

Figures 3, 4:
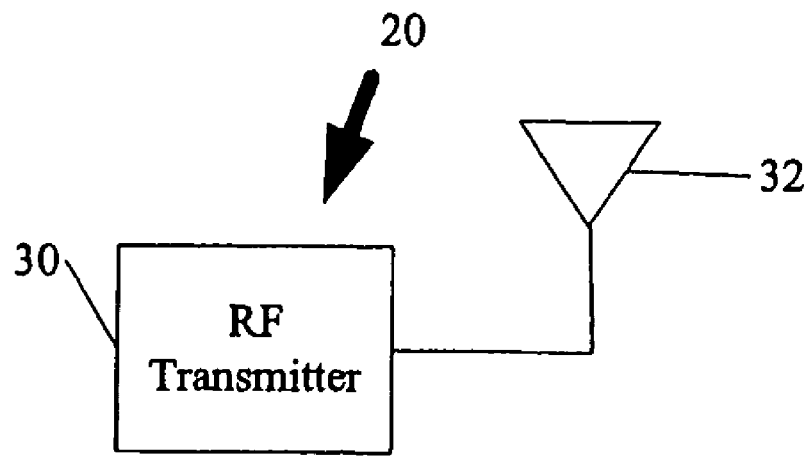
FIG. 3 illustrates an embodiment of the position reporter shown in FIG. 2.
FIG. 4 shows a portion of a reporting format of an embodiment of the invention.

FIG. 3 shows an implementation of position reporter 20 in an embodiment of the invention. In this embodiment, the pointing device is a wireless pointing device. The wireless pointing device includes an RF transmitter 30 and antenna 32 for transmitting position reports to, for example, a personal computer having an RF receiver.

FIG. 4 shows a portion of a reporting packet for reporting the change in position in each of the two directions. RFPacket [X] comprises an eight bit value including bits X0 through X6 and XS and similarly, RFPacket [Y] includes eight bits Y0 through Y6 and YS. Each of these eight bit values can represent a two's complement number in a range from −128 to +127. Flags ScalingFlag[X] and ScalingFlag [Y] are flags indicate whether the respective values in RFPacket [X] and RFPacket [Y] have been scaled.

Figure 5A:
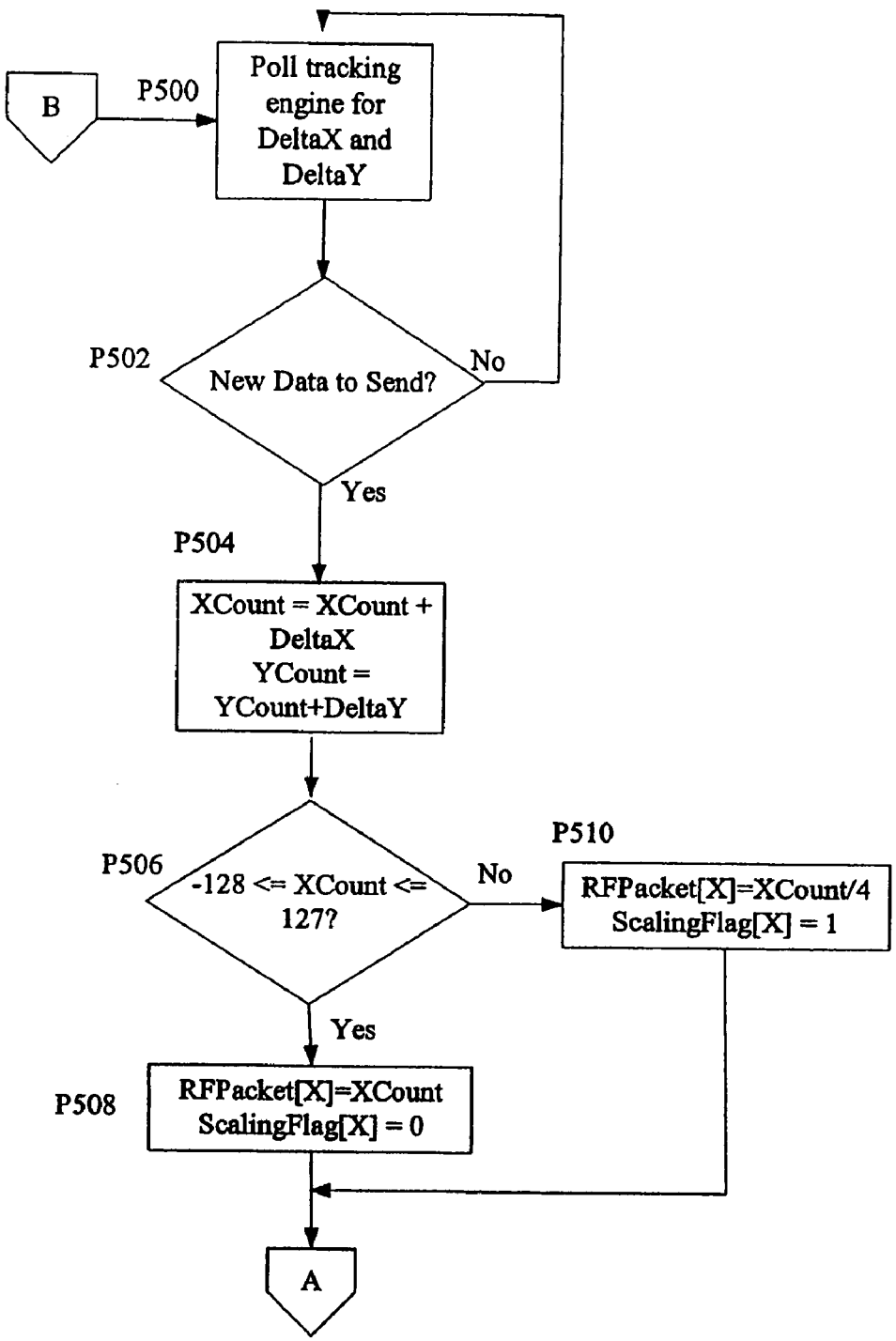
FIGS. 5A and 5B are respective portions of a flowchart illustrating processing in an embodiment of the invention.
Figure 5B:
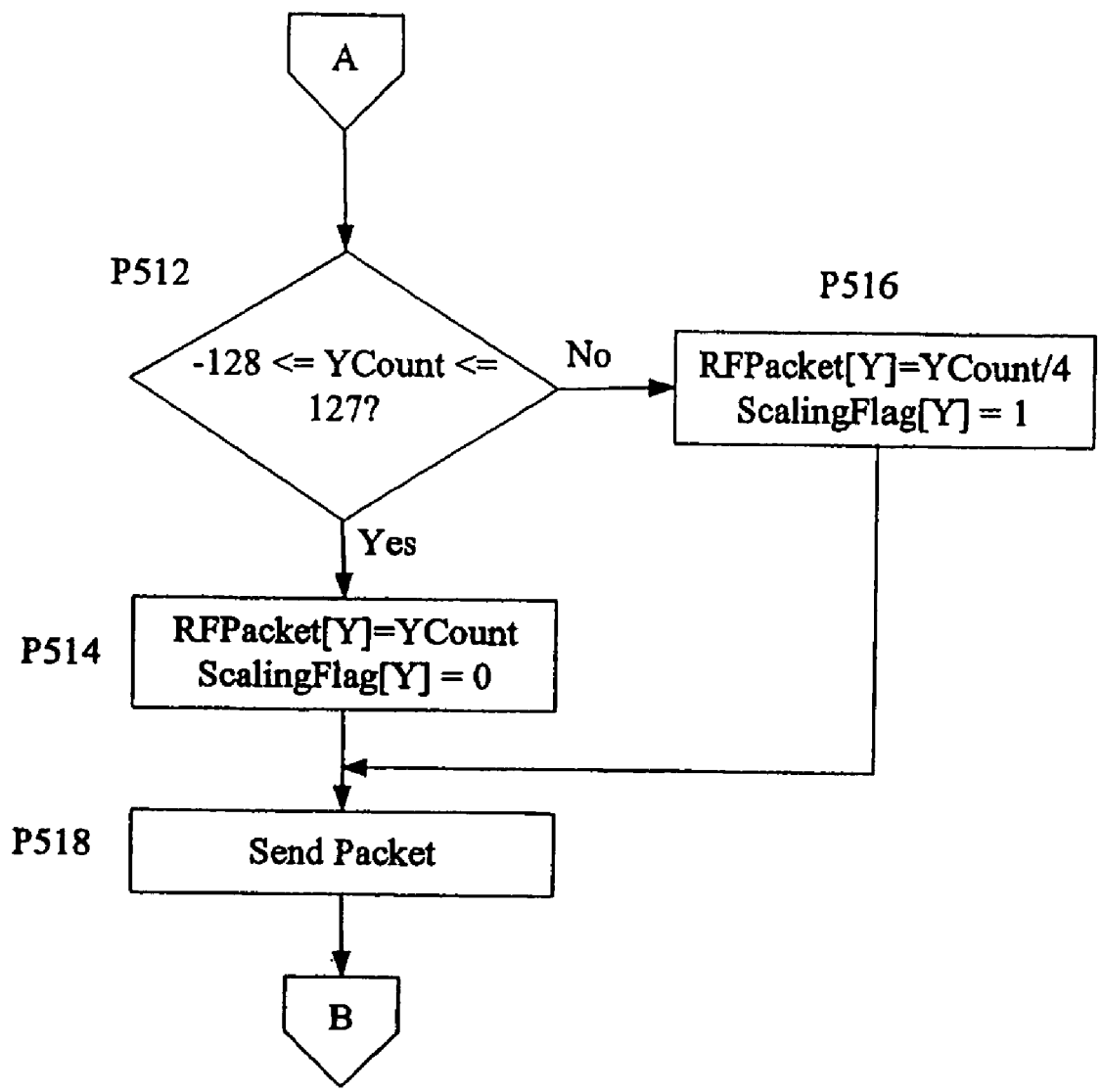

Referring now to the flowchart of FIGS. 5A and 5B, a method of an embodiment of the invention is explained. In this embodiment two types of displacement are reported, the actual displacement and ¼ of the actual displacement. This effectively reduces the exponent field, corresponding to the scaling flag or indicator, to a single bit, which further saves space in the resulting RF packet, while maintaining accuracy at low to medium mouse speeds. In this embodiment, the pointing device accumulates motion displacements from tracking engine 12 into 16 bit accumulators. At P500, comparator 24 polls tracking engine 12 for values, for example, ΔX and ΔY, representing an amount of movement of the operation instrumentality in each of two directions.

At P502, a check is made to determine whether there is any new data to report. This can be accomplished, for example, by determining whether either of ΔX or ΔY is non-zero. If ΔX or ΔY is non-zero, then there is new data to report and the process continues with step P504. Otherwise the process proceeds to step P500 to poll the tracking engine again.

At P504, comparator 24 accumulates a respective value for each of the two reported values into the respective 16 bit accumulators. For example, a count, XCount is determined by adding a current value of XCount to ΔX to provide a new value of XCount and a count, YCount, is determined by adding a current value of YCount to ΔY to provide a new value of YCount.

P506 is performed to determine whether the value of XCount can be represented by a predetermined number of bits. In this embodiment, determination is made as to whether the value of XCount can be represented in an eight bit two's complement value. Thus, it is determined whether the value XCount is in a range of −128 to +127. If XCount is within this range, then at P508, the value of XCount is not scaled, but is placed in a reporting packet and a scaling flag is reset to zero. That is, the unscaled mantissa is reported with an exponent (scaling flag) indicating that the mantissa reflects the actual motion displacement.

If at P506, comparator 24 determines that the value of XCount is not within the range of −128 through +127, then XCount is divided by a scaling factor, for example, four. That is, XCount is shifted to the right by two bits (causing the least significant two bits to be dropped) and the shifted value of XCount is then placed in a reporting packet. The scaling flag, ScalingFlag[X], is set to one to indicate that the reported XCount value has been scaled. That is, the scaled mantissa (approximately ¼ the motion displacement) is reported with an exponent (scaling flag) indicating that the mantissa reflects ¼ of the actual motion displacement. Some accuracy may be lost (note that the two least significant bits are dropped during the shifting operation), but this is insignificant when the operation instrumentality of the pointing device indicates high-speed motion displacement.

At P512, the comparator 24 determines whether the value of YCount can be represented by the predetermined number of bits. That is, the comparator determines whether −128≦YCount≦127, in this embodiment. If YCount is within this range, then YCount is placed in the reporting packet and the scaling flag, ScalingFlag[Y], is reset to zero at P514. That is, the unscaled mantissa is reported with an exponent (scaling flag) indicating that the mantissa reflects the actual motion displacement. Otherwise, the value in YCount is shifted to the right by two bits (causing the least significant two bits to be dropped), or divided by four, and placed in the reporting packet and the scaling flag, ScalingFlag[Y], set to one to indicate that the value of YCount in the reporting packet is scaled. That is, the scaled mantissa (approximately ¼ the motion displacement) is reported with an exponent (scaling flag) indicating that the mantissa reflects ¼ of the actual motion displacement.

At P518, the reporting packet is sent to, for example, an RF receiver associated with a computer, for example, a personal computer.

The following example shows how values of XCount and YCount may be reported in the above embodiment of the invention. For example, suppose that the values to be reported are an XCount value of 345 and a YCount value of 46. Because XCount is not within the range of −128 through +127, the value 345 will be shifted to the right by two bits, or divided by four, which produces the value 86. The scaling flag associated with X, ScalingFlag[X] is then set to one to indicate that the reported value of XCount has been scaled. As mentioned above, while a loss of precision may occur when performing scaling, the loss is generally not significant when moving a pointing device at high speed.

In the example, the value for YCount is 46, which is within the range of −128 through +127. Therefore, the value of YCount would be reported without performing scaling and the scaling flag associated with YCount, ScalingFlag [Y], would be reset to zero to indicate that no scaling of YCount was performed.

Figure 6A:
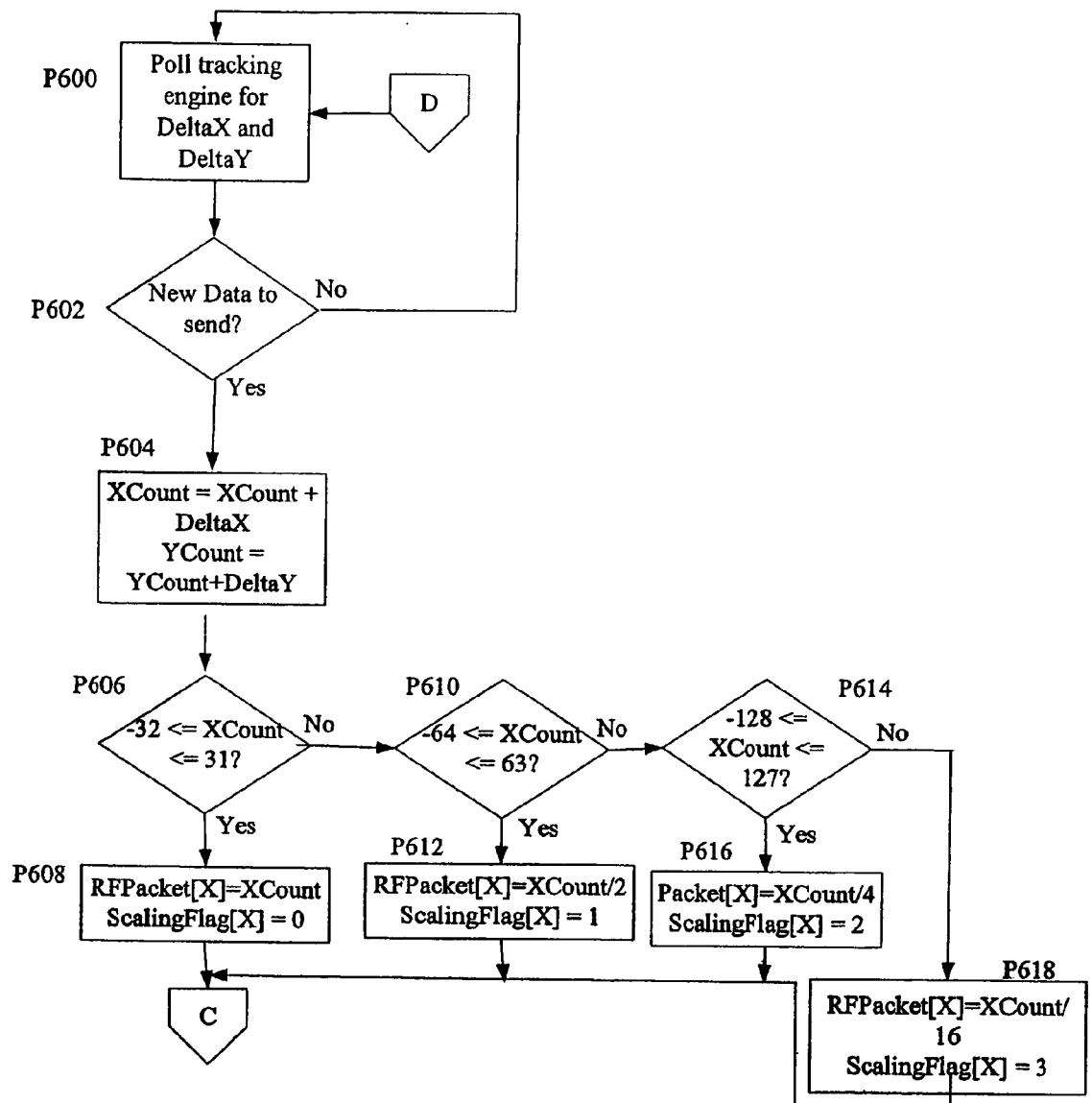
FIGS. 6A and 6B are respective portions of a flowchart illustrating processing in another embodiment of the invention.
Figure 6B:
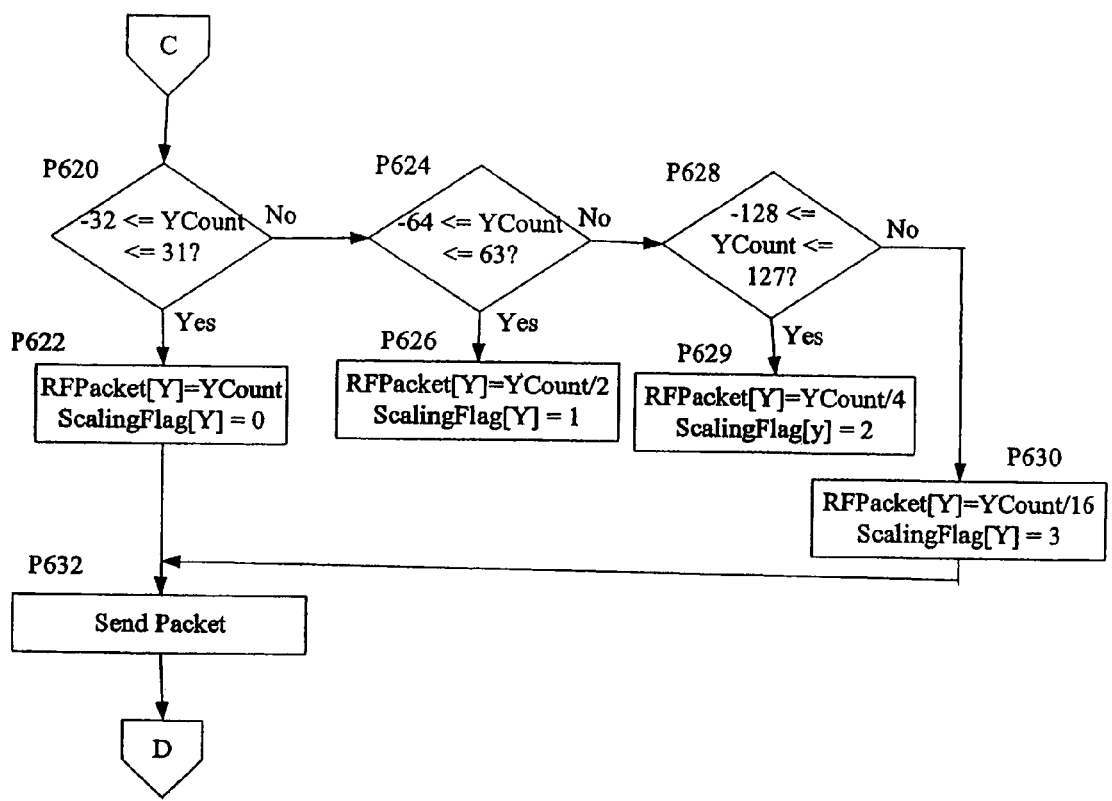

Referring now to the flowchart of FIGS. 6A and 6B, a method of another embodiment of the invention is explained. This embodiment uses one of 4 different exponents with a 6 bit displacement value. One of four scaling factors, corresponding to one of four exponents, may be selected for scaling the XCount value and the YCount value. The four scaling factors may be, for example, 0 through 3, corresponding to exponents $2^0$, $2^1$, $2^2$ and $2^4$, respectively.

Steps P600 through P604 correspond to steps P500 through P504, respectively, and therefore, will not be discussed further.

At P606, the value of XCount is examined to determine whether it will fit in a first predetermined number of bits, for example, a six bit signed two's complement number. That is, XCount is checked to determine whether it is within a range of −32 to +31. If the value of XCount falls within this range, then the value of XCount will be copied into the reporting packet and the scaling flag corresponding to XCount, ScalingFlag[X], will be set to zero indicating no scaling. That is, the unscaled mantissa is reported with a scaling factor of 0, indicating an exponent of $2^0$.

If, at P606, comparator 24 determines that XCount does not fall within the range of −32 to +31, then at P610, a check will be made to determine whether XCount can fit into a second predetermined number of bits. That is, whether XCount will fit into a seven bit two's complement number. Therefore, XCount is checked to determine whether it is in a range from −64 through +63. If it is within this range, then at P612, the value of XCount will be shifted to the right by one bit (dropping the least significant bit), effectively dividing XCount by two and placing the shifted value of XCount in a reporting packet. The scaling flag, ScalingFlax[X] will be set to one indicating that the value of XCount has been scaled. That is, the scaling flag, corresponding to an exponent of $2^1$, indicates that the mantissa has been scaled to ½ of its original value.

If, at step P610, the comparator 24 determines that XCount does not fall within the range of −64 through +63, at P614, a determination will be made as to whether XCount can fit within a third predetermined number of bits. That is, in this embodiment, whether XCount can fit into an eight bit two's complement number. Therefore, XCount is checked to determine whether it is in a range from −128 to +127. If it is within this range, then P616 will be performed to shift the value of XCount to the right by two bit positions (causing the least significant two bits to be dropped), effectively dividing XCount by four and placing the shifted value of XCount in the reporting packet. The scaling factor for XCount, ScalingFactor[X], will be set to two, corresponding to an exponent of $2^2$, and indicates that the mantissa has been scaled to ¼ of its original value.

If, at step P614, the comparator 24 determines that XCount does not fall in the range of −128 to +127, then P618 will be performed to shift the value of XCount to the right by four bit positions (causing the least significant four bits to be dropped), effectively dividing XCount by sixteen and placing the shifted value of XCount in the reporting packet. The scaling factor for XCount, ScalingFactor[X], will be set to three, corresponding to an exponent of $2^4$, and indicates that the mantissa has been scaled to 1/16 of its original value.

At P620, the value of YCount is examined to determine whether it will fit in a first predetermined number of bits, for example, a six bit signed two's complement number. That is, YCount is checked to determine whether it is within a range of −32 to +31. If the value of YCount falls within this range, then the value of YCount will be copied into the reporting packet and the scaling flag corresponding to YCount, ScalingFlag[Y], will be set to zero indicating no scaling. That is, the unscaled mantissa is reported with a scaling factor of 0, indicating an exponent of $2^0$.

If, at P620, comparator 24 determines that YCount does not fall within the range of −32 to +31, then at P624, a check will be made to determine whether YCount can fit into a second predetermined number of bits. That is, whether YCount will fit into a seven bit twos complement number. Therefore, YCount is checked to determine whether it is in a range from −64 through +63. If it is within this range, then at P626, the value of YCount will be shifted to the right by one bit (dropping the least significant bit), effectively dividing YCount by two and placing the shifted value of YCount in a reporting packet. The scaling flag, ScalingFlag[Y] will be set to one indicating that the value of YCount has been scaled. That is, the scaling flag corresponds to an exponent of $2^1$ and indicates that mantissa has been scaled to ½ of its original value.

If, at step P624, the comparator 24 determines that YCount does not fall within the range of −64 through +63, at P614, a determination will be made as to whether YCount can fit within a third predetermined number of bits. That is, in this embodiment, whether YCount can fit into an eight bit two's complement number. Therefore, YCount is checked to determine whether it is in a range from −128 to +127. If it is within this range, then P629 will be performed to shift the value of YCount to the right by two bit positions (causing the least significant two bits to be dropped), effectively dividing YCount by four and placing the shifted value of YCount in the reporting packet. The scaling factor for YCount, ScalingFactor[Y], will be set to two, corresponding to an exponent of $2^2$, and indicates that the mantissa has been scaled to ¼ of its original value.

If, at step P628, the comparator 24 determines that YCount does not fall in the range of −128 to +127, then, at P630 will be performed to shift the value of YCount to the right by four bit positions (causing the least significant four bits to be dropped), effectively dividing YCount by sixteen and placing the shifted value of YCount in the reporting packet. The scaling factor for YCount, ScalingFactor[Y], will be set to three, corresponding to an exponent of $2^4$, and indicates that the mantissa has been scaled to 1/16 of its original value.

At P632, the reporting packet is sent to, for example, an RF receiver associated with a computer, for example, a personal computer.

The embodiment of FIGS. 5A and 5B may use, for example, 8 bits for the signed displacement or mantissa and 1 bit for the scaling flag or exponent. The embodiment of FIGS. 6A and 6B may use, for example, 6 bits for the signed displacement or mantissa and 2 bits for the scaling flag or exponent. Thus, in the latter embodiment, one fewer bit, 8 bits, may be used as compared to the former embodiment's use of 9 bits to report a change of position in a direction. Of course, other numbers of bits may be used for the signed displacement and the scaling flag. The embodiments of FIGS. 5A and 5B and FIGS. 6A and 6B do not lose any accuracy at lower speeds, although less accuracy may be achieved at higher speeds by the embodiment of FIGS. 6A and 6B as compared with the embodiment of FIGS. 5A and 5B.

The above embodiments use scaling factors of two, four and sixteen. The invention is not limited to these specific scaling factors. Other scaling factors may also be used.

In the above embodiments, the comparator may include processor 14 and instructions in ROM and/or RAM for comparing XCount or YCount to the values mentioned above. Further, scaler 22 may include processor 14 and instructions in ROM and/or RAM for scaling, or dividing XCount or YCount by the values mentioned above. Although the above embodiments, as described, represent a signed displacement and scaling factor, respectively, in mantissa and exponent bit fields (a floating point format), these values may be represented, and the scaling may be performed, in various other ways known in the art. In addition to a software or firmware implementation of the invention, the invention may also be implemented in hardware.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, the use of the labels for algorithm variables appearing in the specification is for convenience and clarity and is not intended to have any limiting effect.

I claim:

1. A computer-readable medium for reporting a movement amount of an operation instrumentality of a pointing device and having computer-executable instructions to perform the steps comprising:

examining a first value representing the movement amount of the operation instrumentality of the pointing device in a first direction;

determining whether the first value can be represented by a first predetermined number of bits, and when this first determining step determines that the first value can be represented by the first predetermined number of bits, setting a first scaling indicator to indicate that the first value is unscaled;

when the first value cannot be represented by the first predetermined number of bits, performing the steps of:

determining whether the first value can be represented by a second predetermined number of bits, which is different from the first predetermined number of bits, and when the first value can be represented by the second predetermined number of bits, performing the steps of:

scaling the first value by a first scaling factor, and setting a first scaling indicator to indicate that the first value is scaled by the first scaling factor; and when the second determining step determines that the first value cannot be represented by the second predetermined number of bits, performing the steps of:

determining whether the first value can be represented by a third predetermined number of bits, which is different from the first and the second predetermined number of bits, and when the first value can be represented by the third predetermined number of bits, performing the steps of:

scaling the first value by a second scaling factor, and setting the first scaling indicator to indicate that the first value is scaled by the second scaling factor; and outputting reporting information including the first value if no scaling has been performed, and in the event scaling has been performed, outputting the scaled first value and the first scaling indicator.

2. The computer-readable medium of claim 1, when the third determining step determines that the first value cannot be represented by the third predetermined number of bits, containing further computer-executable instructions for:

scaling the first value by a third scaling factor, and setting the first scaling indicator to indicate that the first value is scaled by the third scaling factor.

3. The computer-readable medium of claim 1, containing further computer-executable instructions for:

examining a second value representing the movement amount of the operation instrumentality of the pointing device in a second direction;

determining whether the second value can be represented by the first predetermined number of bits and when this fourth determining step determines that the second value can be represented by the first predetermined number of bits, setting a second scaling indicator to indicate that the second value is unscaled;

when the second value cannot be represented by the first predetermined number of bits, performing the steps of:

determining whether the second value can be represented by the second predetermined number of bits and when the second value can be represented by the second predetermined number of bits, performing the steps of:

scaling the second value by the first scaling factor, and setting a second scaling indicator to indicate that the second value is scaled by the first scaling factor; and when this fifth determining step determines that the second value cannot be represented by the second predetermined number of bits, performing the steps of:

determining whether the second value can be represented by the third predetermined number of bits, and when the second value can be represented by the third predetermined number of bits, performing the steps of:

scaling the second value by the second scaling factor, and setting the second scaling indicator to indicate that the second value is scaled by the second scaling factor; and outputting reporting information including the second value if no scaling of the second value has been performed, and in the event scaling of the second value has been performed, outputting the scaled second value and the second scaling indicator.

4. The computer-readable medium of claim 3, wherein when the sixth determining step determines that the second value cannot be represented by the third predetermined number of bits, the steps of scaling the second value by a third scaling factor, and setting the second scaling indicator to indicate that the second value is scaled by the third scaling factor are performed.

5. The computer-readable medium of claim 3, wherein the second value is represented as a two's complement value.

6. The computer-readable medium of claim 3, wherein the outputting step utilizes an RF communications channel.

7. The computer-readable medium of claim 1, wherein the first value is represented as a two's complement value.

8. The computer-readable medium of claim 1, wherein the outputting step utilizes an RF communications channel.

* * * * *